United States Patent [19]

Ross

[11] Patent Number: 5,774,493
[45] Date of Patent: Jun. 30, 1998

[54] SEQUENCE CONSTRUCTIONS FOR DELAY-AND-CORRELATE TRANSMITTED REFERENCE SIGNALING

[75] Inventor: John Anderson Fergus Ross, Schenectady, N.Y.

[73] Assignee: General Electric Company, Schenectady, N.Y.

[21] Appl. No.: 691,254

[22] Filed: Aug. 2, 1996

[51] Int. Cl.⁶ .................................................. H04B 1/707
[52] U.S. Cl. .......................................... 375/206; 375/200
[58] Field of Search ................................... 375/200, 202, 375/206–210, 343, 367; 370/342, 479, 515

[56] References Cited

U.S. PATENT DOCUMENTS

| | | | |
|---|---|---|---|
| 4,862,478 | 8/1989 | McIntosh | 375/200 |
| 4,866,732 | 9/1989 | Carey et al. | 375/200 |
| 4,969,159 | 11/1990 | Belcher et al. | 375/207 |
| 5,243,622 | 9/1993 | Lux et al. | 375/206 |
| 5,278,864 | 1/1994 | Mori et al. | 375/208 |
| 5,353,301 | 10/1994 | Mitzlaff | 375/200 |
| 5,559,828 | 9/1996 | Armstrong et al. | 375/200 |

*Primary Examiner*—Young T. Tse
*Attorney, Agent, or Firm*—Marvin Snyder

[57] ABSTRACT

A direct conversion receiver for delay-and-correlate transmitted reference spread spectrum signaling apparatus improves the performance of a delay-and-correlate transmitted reference spread spectrum communication system with essentially no added complexity over prior designs. The message signal contains the information to be communicated, which has been spread through multiplication with a wide band spreading waveform. The reference signal consists of the spreading waveform itself which the receiver can use to despread the message signal and recover the information. Operation of the invention hinges on generation of a class of reference signals at the transmitter which produce more reliable data output signals at the receiver.

5 Claims, 4 Drawing Sheets

SEQUENCE CONSTRUCTIONS FOR DELAY-AND-CORRELATE TRANSMITTED REFERENCE SIGNALING

BACKGROUND OF THE INVENTION

1. Field of the Invention

This invention relates to spread spectrum communications systems and, more particularly, to a delay-and-correlate transmitted reference spread spectrum communications system with superior performance without increased complexity.

2. Description of the Prior Art

Spread spectrum communications offer several advantages in communications applications requiring high reliability. These include low density power spectra and interference rejection. In the case of interference rejection, the interference may be accidental, that is, simply part of the environment of the communication system. In a specific application, the communications environment may include many potential reflectors giving rise to severe multipath interference. Such multipath interference typically insinuates deep nulls in the form of frequency selective fading. Spread spectrum communications is an ideal countermeasure to this difficulty.

There are several types of spread spectrum systems including direct sequence digital systems, frequency hopping systems, time hopping systems, pulsed frequency modulated (or chirp) systems, and various hybrids. Of these, the direct sequence digital systems and frequency hopping systems are perhaps the more widely implemented. In a direct sequence digital system, a pseudorandom code generator is used to modulate a frequency modulated carrier. In a frequency hopping system, a coherent local oscillator is made to jump from one frequency to another.

Direct sequence spread spectrum modulation involves a wideband signal modulated by a narrowband message signal. A conventional implementation is to generate a wideband signal by means of a high speed shift register of n-stages with modulo-two feedback according to a primitive polynomial. The high speed digital sequence is then supplied to a balanced modulator whose other input signal is a narrowband carrier. The output signal of the balanced modulator is a wideband signal sometimes referred to as a "wideband carrier".

Spread spectrum communications are often asymmetric in cost and complexity. For example, suitable spread spectrum signals may be generated with relatively low complexity circuitry. The challenge is then the demodulation of such signals. Usually, it is necessary to construct a demodulator which can generate or otherwise process a wideband signal in order to recover the narrowband message. Synchronization is often the most difficult and costly aspect of a spread spectrum communications system.

In order to simplify the receiver in a spread spectrum communications system, it is known to transmit a reference that may be used in place of synchronization and tracking at the receiver; that is, the coded reference is generated and transmitted with the intended information signal. Since the local reference is generated at the transmitter, the receiver need not have a code sequence or other local reference generator.

The present invention relates to the direct sequence digital type of spread spectrum communications system using a transmitted reference. A delay-and-correlate receiver is used to achieve synchronization. A description of the direct sequence digital type of spread spectrum communications system, as well as other types of spread spectrum communications systems, may be found, for example, in *Spread Spectrum Systems,* 3rd Ed., by Robert C. Dixon, John Wiley & Sons (1994), and *Spread Spectrum Communications,* Vol. II, by M. K. Simon et al., Computer Science Press (1985).

SUMMARY OF THE INVENTION

An object of the present invention to provide a method and apparatus which will improve performance of a delay-and-correlate transmitted reference spread spectrum communication system with essentially no added complexity over prior designs.

The invention eliminates need for a local reference by transmitting a reference that the receiver can use to perform despreading. The method and apparatus of the invention is in the class of systems known as "transmitted reference" spread spectrum systems. In general, a transmitted reference system sends both a message signal and a reference signal to the receiver. The message signal contains the information to be communicated, which has been spread through multiplication with a wide band "spreading waveform". The reference signal consists of the spreading waveform itself, which the receiver can use to despread the message signal and recover the information. The method of the invention hinges on generating a class of reference signals at the transmitter which produce highly reliable data output signals at the receiver.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
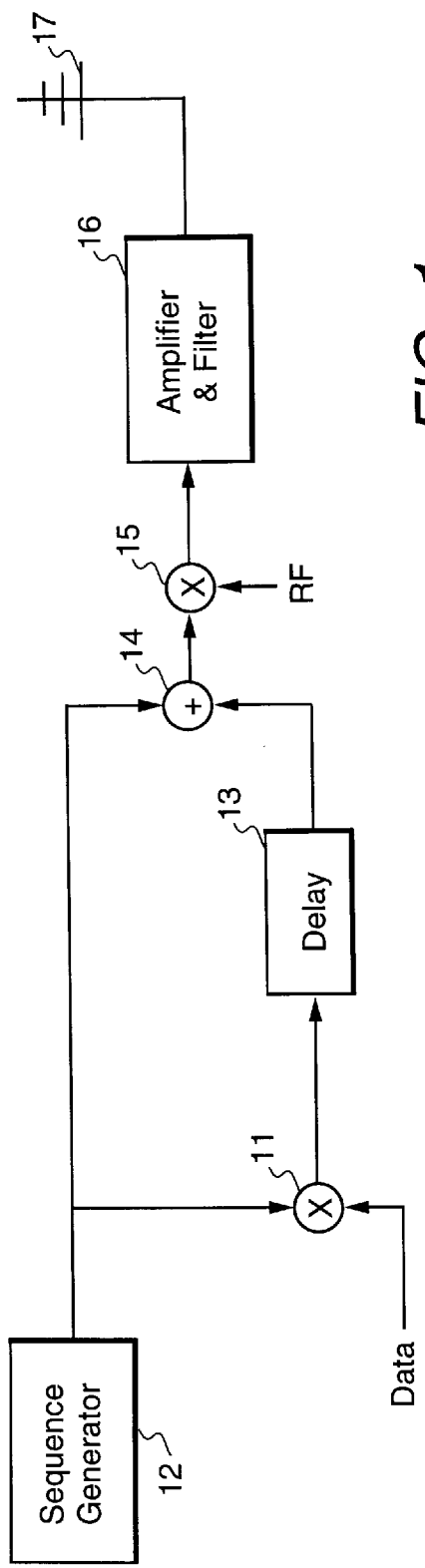
FIG. 1 is a block diagram of the transmitter according to the invention.

FIG. 1 illustrates a transmitter according to the invention. Data comprising a message signal are applied to one input of a multiplier 11, and a reference signal generated by a sequence generator 12 is applied to the other input of multiplier 11. The reference signal constitutes a wide band spreading waveform. The output signal of multiplier 11, which through this multiplication has been spread over a wide frequency spectrum, is supplied to a digital or analog delay line 13 which provides a known delay. The delayed signal from delay line 13 which, for a digital signal comprises a shift register 13, is added to the code produced by sequence generator 12 in a linear adder 14, and the summed signal is mixed with a local radio frequency (RF) signal in a mixer 15. The signal produced by mixer 15 is amplified and filtered in the transmitter output stage 16, forming the transmitted signal applied to an antenna 17.

Figure 2:
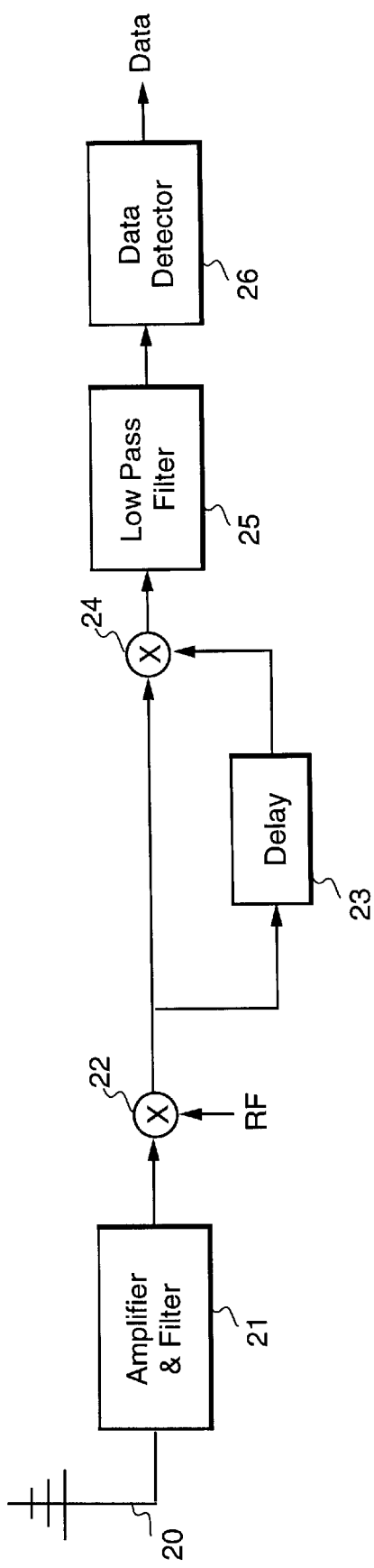
FIG. 2 is a block diagram of the receiver according to the invention.

The receiver accroding to the invention is shown in FIG. 2. The signal received on an antenna 20 is amplified and filtered in an RF stage 21 and then converted to an intermediate frequency by a mixer 22. The output signal of mixer 22 is applied to a delay line 23 which provides a delay equal to that of delay line 13 in the transmitter. The delayed signal from delay line 23 is multiplied by the output signal of mixer 22 in a multiplier 24, which despreads the message signal, and the product signal is filtered by a low pass filter 25 before being provided to a data detector 26.

According to one aspect of the invention, delay-and-correlate transmitted reference signaling, facilitated by a delay-and-correlate device comprised of a delay path 13, linear adder 14, and mixer 15 in the transmitter of FIG. 1, is enhanced by employing reference signals with specific autocorrelation properties. A simple mathematical argument identifies the desired properties of the new sequences. Denoting the reference signal by p(t), the message signal by m(t), and the delay by d, the multiplication performed at the receiver (excluding noise and interference) is $$[p(t) + m(t-d)p(t-d)] \times [p(t-d) + m(t-2d)p(t-2d)] =$$

$$p(t)p(t-d) + p(t)p(t-2d)m(t-2d) +$$

$$m(t-d)p(t-d)p(t-d) + m(t-d)p(t-d)p(t-2d)m(t-2d).$$

Pseudo-noise (PN) sequences are commonly used in spread-spectrum systems as they have low autocorrelation for delays greater than zero and have been identified as being useful for delay-and-correlate transmitted reference signaling. For example, if p(t) is a PN sequence, the third term in the above expansion will have positive correlation while all other terms will be small and the message signal will be easily identified after correlation. Moreover, in many cases it is also possible to exploit the second term. If the delay is such that the second term is small relative to a symbol interval, a strong autocorrelation of p(t) at delay 2d will magnify the output signal of the correlation process without requiring any additional filtering. If delay 2d is comparable in duration to that of the symbol, then some form of intersymbol-interference equalization would be required. Because such equalization is undesirable in low-cost receiver design, this invention incorporates small delay d. The resulting increased message signal strength improves the error performance of the receiver subjected to noise.

A method of constructing useful sequences is set forth below. A delay of time d is chosen such that the delay 2d is equal to the duration of an odd number of chip intervals, a chip interval being the length of time taken to transmit one element of the spreading sequence. Then a PN sequence, $$x(1), x(2), x(3), \ldots, x(N),$$

where x(j) are elements of the sequence, is altered by replacing the term at 2d+j with x(j), j odd, over the length of the sequence, starting at 2d+1. The new sequence is $$x(1), x(2), x(3), \ldots x(2d), x(1), x(2d+2), x(3), x(2d+4), x(5), \ldots$$

This will provide a desirable autocorrelation peak at 2d. Methods replacing other than half of the symbols are also possible.

Figure 3:
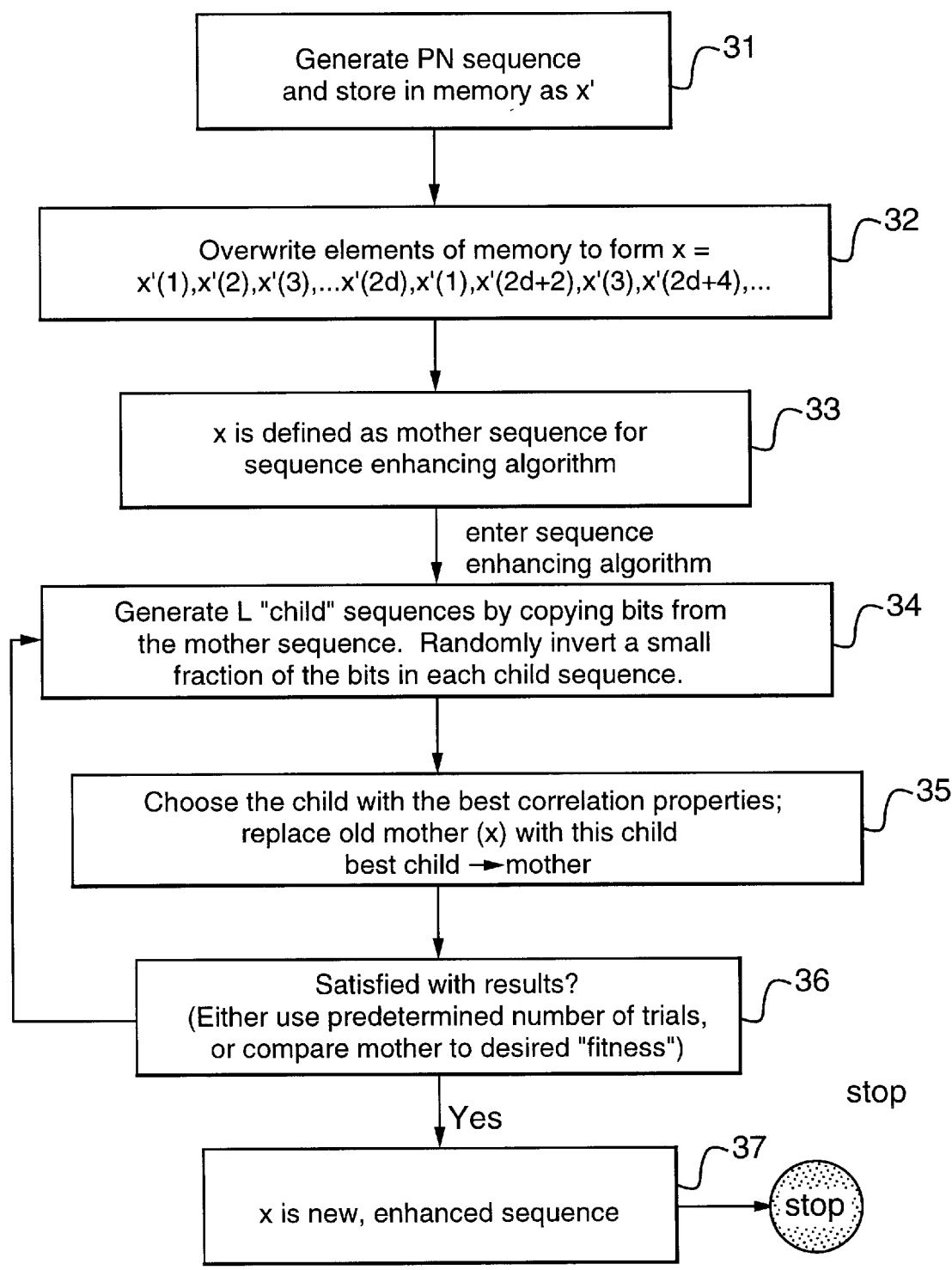
FIG. 3 is a flow diagram of a computer program used to generate sequences.

To further improve the autocorrelation properties of the new sequences, a computer program was written which creates N new sequences by randomly selecting elements of the original sequence for inversion (or sign change). The best of the new sequences was stored as the "mother" sequence to create a new set of randomly perturbed sequences. After many generations, better sequences are often found. FIG. 3 is a flow diagram showing the procedure.

With reference to FIG. 3, the first step 31 of the procedure is to generate a PN sequence and store the sequence in memory as x'. Then at step 32 elements of memory are overwritten to form $$x=x'(1), x'(2), x'(3), \ldots, x'(2d), x'(1), x'(2d+2), x'(3), x'(2d+4), \ldots$$

where x is defined as the mother sequence for the sequence enhancing algorithm 33. At this point in the procedure, the sequence enhancing algorithm is entered. At step 34 L "child" sequences are generated by copying bits from the mother sequence and a small fraction of the bits in each child sequence is randomly inverted. At step 35, a child is chosen. The criterion for choosing the child is that it have the best correlation properties. Now, the original mother sequence is replaced with this child sequence. A test is made at step 36 to determine if the extant (i.e., new) mother sequence provides satisfactory performance. This is done by either using a predetermined number of trials or comparing the mother sequence to desired "fitness" criteria. If the performance is not satisfactory, the process loops back to step 34 to again generate "child" sequences from the new mother sequence. When the result of the sequence enhancing algorithm is satisfactory, the new enhanced sequence is provided at step 37.

Figure 4:
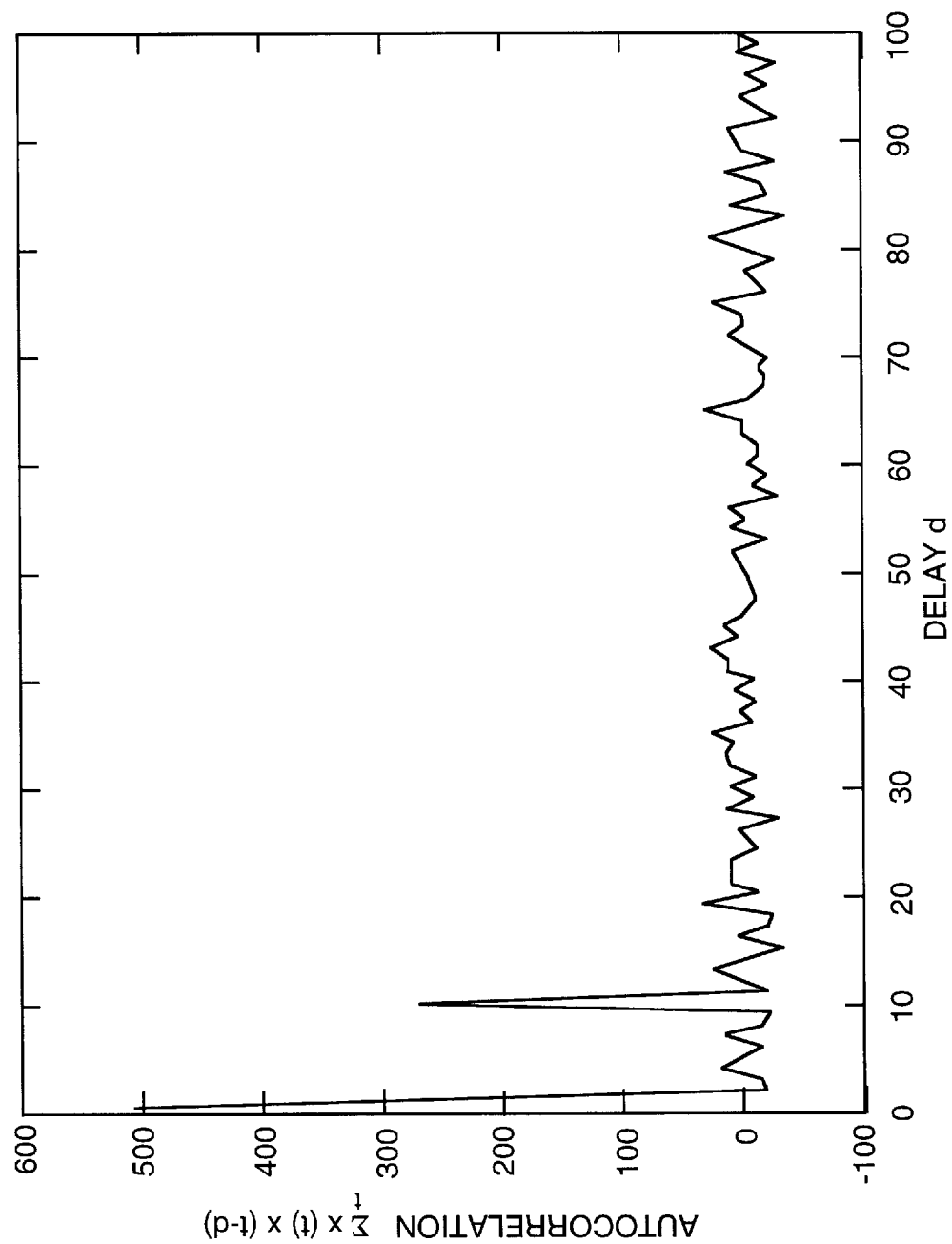
FIG. 4 is a graph showing the autocorrelation of an example of a pseudo-random sequence according to the invention.

An element-by-element list of one particular sequence is shown in Table 1, and FIG. 4 is a plot of the autocorrelation of that sequence.

TABLE 1

| | | | | | | | | | | | | | | | | | | | | | | | | |
|---|---|---|---|---|---|---|---|---|---|---|---|---|---|---|---|---|---|---|---|---|---|---|---|---|
| 1 | 1 | -1 | -1 | 1 | 1 | -1 | 1 | -1 | 1 | 1 | -1 | -1 | 1 | 1 | -1 | 1 | -1 | 1 | -1 | -1 | -1 | 1 | -1 | -1 |
| 1 | -1 | -1 | -1 | 1 | -1 | -1 | -1 | -1 | 1 | 1 | -1 | 1 | 1 | 1 | -1 | 1 | -1 | 1 | 1 | 1 | 1 | 1 | -1 | -1 |
| 1 | -1 | 1 | 1 | 1 | -1 | 1 | -1 | -1 | -1 | 1 | 1 | -1 | -1 | -1 | 1 | -1 | -1 | 1 | 1 | -1 | 1 | -1 |
| -1 | 1 | 1 | -1 | 1 | 1 | -1 | 1 | -1 | -1 | 1 | 1 | 1 | 1 | -1 | 1 | -1 | -1 | 1 | 1 | -1 | 1 | -1 |
| 1 | -1 | -1 | 1 | 1 | -1 | -1 | 1 | -1 | -1 | -1 | 1 | 1 | -1 | -1 | 1 | 1 | 1 | -1 | 1 | 1 | -1 | -1 | -1 | 1 |
| -1 | 1 | -1 | -1 | -1 | -1 | -1 | -1 | 1 | -1 | 1 | -1 | 1 | 1 | 1 | -1 | 1 | 1 | -1 | 1 | -1 | -1 | 1 |
| 1 | 1 | 1 | -1 | -1 | -1 | -1 | -1 | 1 | -1 | 1 | 1 | -1 | 1 | -1 | 1 | -1 | -1 | -1 | 1 | 1 | 1 | -1 | 1 |
| 1 | -1 | 1 | -1 | 1 | 1 | 1 | -1 | 1 | 1 | -1 | 1 | -1 | 1 | -1 | 1 | -1 | -1 | -1 | -1 | -1 | -1 | 1 |
| -1 | -1 | -1 | 1 | -1 | 1 | -1 | -1 | 1 | 1 | -1 | -1 | 1 | -1 | 1 | 1 | -1 | 1 | 1 | -1 | -1 | -1 | 1 | 1 |
| -1 | 1 | -1 | 1 | -1 | 1 | 1 | 1 | 1 | -1 | 1 | -1 | 1 | -1 | 1 | -1 | -1 | 1 | -1 | 1 | -1 | 1 | 1 | 1 |
| -1 | 1 | -1 | 1 | 1 | 1 | 1 | 1 | 1 | -1 | 1 | 1 | 1 | 1 | -1 | 1 | -1 | -1 | 1 | 1 | 1 |
| -1 | -1 | 1 | 1 | 1 | -1 | 1 | -1 | -1 | -1 | 1 | 1 | -1 | 1 | -1 | 1 | -1 | 1 | -1 | 1 | -1 |
| 1 | -1 | 1 | -1 | 1 | -1 | -1 | -1 | 1 | -1 | -1 | -1 | -1 | 1 | -1 | -1 | 1 | 1 | -1 | -1 | -1 | -1 | -1 | 1 |
| -1 | -1 | 1 | 1 | -1 | -1 | 1 | -1 | 1 | 1 | -1 | -1 | -1 | 1 | -1 | 1 | -1 | -1 | -1 | -1 | -1 | -1 | -1 |
| -1 | -1 | -1 | 1 | -1 | -1 | -1 | -1 | -1 | -1 | -1 | -1 | 1 | -1 | -1 | 1 | -1 | -1 | -1 | 1 | 1 | 1 |

TABLE 1-continued

```
-1 -1  1  1  1 -1 -1  1  1 -1 -1  1  1  1  1 -1 -1  1 -1 -1  1  1  1  1 -1
-1  1 -1 -1  1  1  1 -1 -1 -1  1  1 -1 -1  1 -1 -1  1 -1 -1  1 -1 -1  1 -1
-1  1 -1 -1 -1 -1 -1  1  1 -1  1 -1  1 -1  1 -1 -1  1 -1  1  1  1 -1  1  1
-1 -1 -1  1  1  1 -1 -1  1 -1 -1  1 -1  1 -1 -1  1  1  1 -1 -1 -1 -1 -1
 1  1  1  1 -1 -1 -1 -1  1  1  1  1  1  1 -1 -1 -1 -1  1  1  1  1  1  1  1
 - -1 -1  1  1  1  1  1  1  - -1
```

Figure 5:
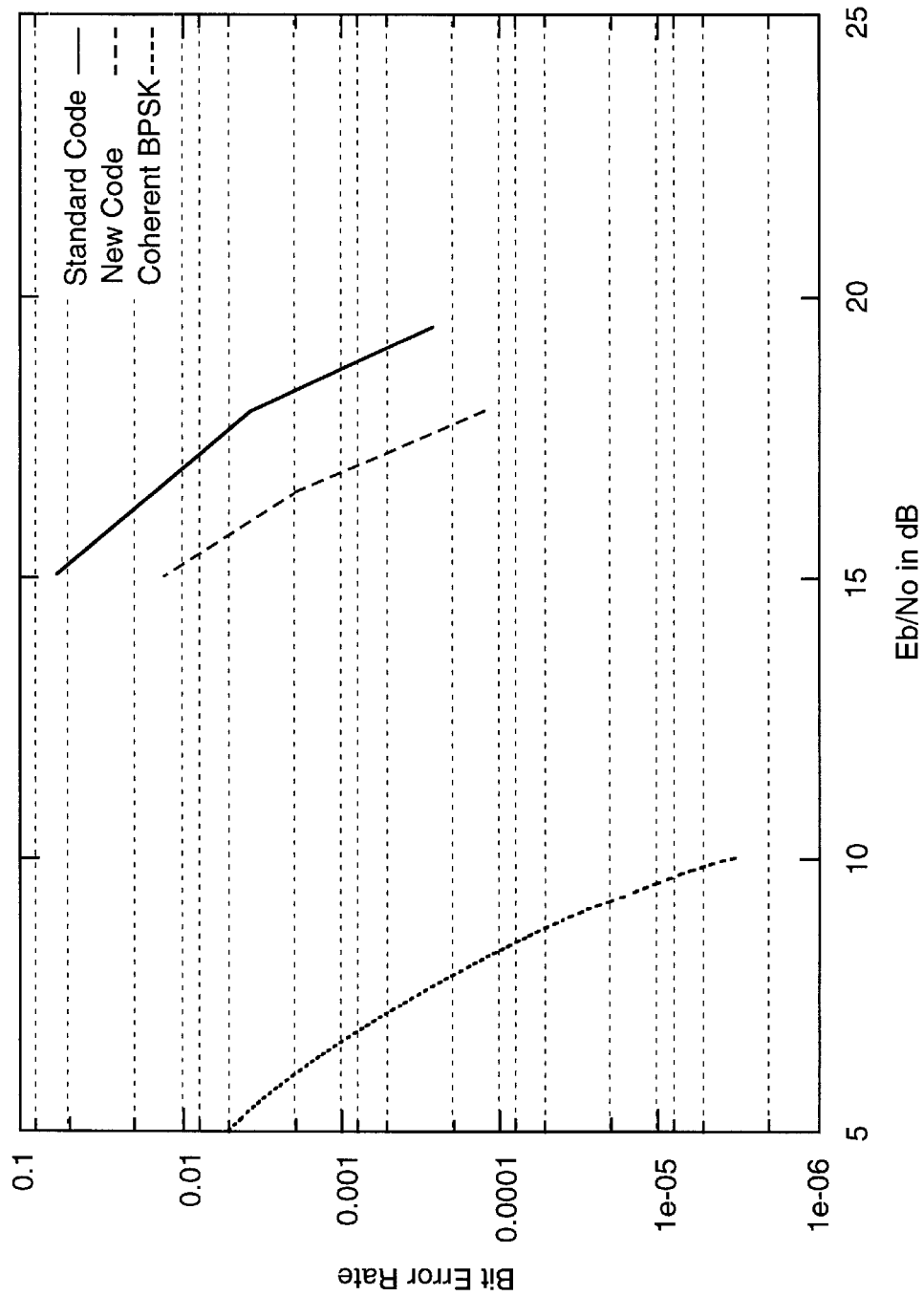
FIG. 5 is a graph showing the results of a simulation of a delay-and-correlate communications system using a pseudo-random sequence generated according to the teachings of the invention.

The effectiveness of this sequence was demonstrated in a computer simulation. The results showing the bit error rate versus energy-per-bit (Eb) to noise power spectral density (No) ratio is given in FIG. 5. Note that the power of the reference signal has not been included in the Eb/No calculation. The improved performance of the new sequence is clear.

A very small read only memory (ROM) or random access memory (RAM) can be used to store the sequence instead of the shift register used traditionally with PN sequences. For example, implementation of a 511 maximal length sequence modified by the procedure described above requires a 511 bit memory. Thus the transmitter shown in FIG. 1 implements sequence generator 12 with a small ROM or RAM having a clocked address counter. This is the only significant change from classical delay-and-correlate transmitted reference systems required by this invention. The performance improvement is thus accomplished at nominal cost.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. In a direct conversion delay-and-correlate transmitted reference spread spectrum signaling system, a transmitter comprising:

a sequence generator for generating a sequence signal characterized as x(1),x(2),x(3), . . . ,x(N), where x(j) are elements of the sequence, said sequence generator being adapted to modify the sequence signal to generate an enhanced sequence signal having improved autocorrelation properties;

a first multiplier for generating a first product signal by multiplying the sequence signal from the sequence generator and input data to be transmitted;

a first delay device for delaying the product signal from said multiplier by a delay d, where twice the delay, 2d, is an odd number of chip intervals;

a summer for generating a summed signal for summing the delayed product signal with the sequence signal from said sequence generator; and first radio frequency means, including a mixer, for converting said summed signal to a signal for transmission.

2. The apparatus of claim 1 wherein said sequence generator is adapted to alter the sequence signal by replacing the term at 2d+j with x(j), j odd, over the length of the sequence, starting at 2d+1 to produce the sequence x(1),x(2),x(3), . . . x(2d),x(1), x(2d+2) ,x(3),x(2d+4),x(5), . . . that will provide a desirable autocorrelation peak at 2d.

3. The apparatus of claim 1 further comprising:

a receiver including
second radio frequency means, including a mixer, for converting a received signal to a baseband signal;
a second delay device coupled to the output of the second radio frequency means for delaying said baseband signal by a delay d;
a second multiplier for generating a second product signal by multiplying the baseband signal by the baseband signal delayed by delay d; and
a data detector responsive to said second product signal for detecting transmitted data.

4. The apparatus of claim 3 wherein the multiplication performed by said second multiplier is [p(t)+m(t−d)p(t−d)] x[p(t−d)+m(t−2d)p(t−2d)]=p(t)p(t−d)+p(t)p(t−2d)m(t−2d)+ m(t−d)p(t−d)p(t−d)+m(t−d)p(t−d)p(t−2d)m(t−2d), where p(t) is a reference signal and m(t) is a message signal, and wherein the delay is such that the second term is small relative to a symbol interval producing a strong autocorrelation of p(t) at delay 2d.

5. A direct conversion delay-and-correlate transmitted reference spread spectrum signaling system comprising:

a transmitter including
a sequence generator for generating a sequence signal characterized as x(1),x(2),x(3), . . . ,x(N), where x(j) are elements of the sequence, said sequence generator being adapted to modify the sequence signal to generate an enhanced sequence signal having improved autocorrelation properties;
first multiplier for generating a first product signal by multiplying the sequence signal from the sequence generator and input data to be transmitted;
a first delay device for delaying the product signal from said multiplier by a delay d, where twice the delay, 2d, is an odd number of chip intervals;
a summer for generating a summed signal for summing the delayed product signal with the sequence signal from said sequence generator; and
first radio frequency means, including a mixer, for converting said summed signal to a signal for transmission;
said sequence generator being adapted to alter the sequence signal by replacing the term at 2d+j with x(j), j odd, over the length of the sequence, starting at 2d+1 to produce the sequence x(1),x(2),x(3), . . . x(2d),x(1), x(2d+2) ,(3),x(2d+4),x(5), . . . that will provide a desirable autocorrelation peak at 2d; and a receiver including
second radio frequency means, including a mixer, for converting a received signal to a baseband signal;
a second delay device coupled to the output of the second radio frequency means for delaying said baseband signal by a delay d;
a second multiplier for generating a second product signal by multiplying the baseband signal by the baseband signal delayed by delay d, wherein the multiplication performed by said second multiplier is [p(t)+m(t−d)p(t−d)]x[p(t−d)+m(t−2d)p(t−2d)]=p(t)p (t−d)+p(t)p(t−2d)m(t−2d)+m(t−d)p(t−d)p(t−d)+m (t−d)p(t−d)p(t−2d)m(t−2d), where p(t) is a reference signal and m(t) is a message signal, and wherein the delay is such that the second term is small relative to a symbol interval producing a strong autocorrelation of p(t) at delay 2d; and
a data detector responsive to said second product signal for detecting transmitted data.

\* \* \* \* \*